Patented July 27, 1937

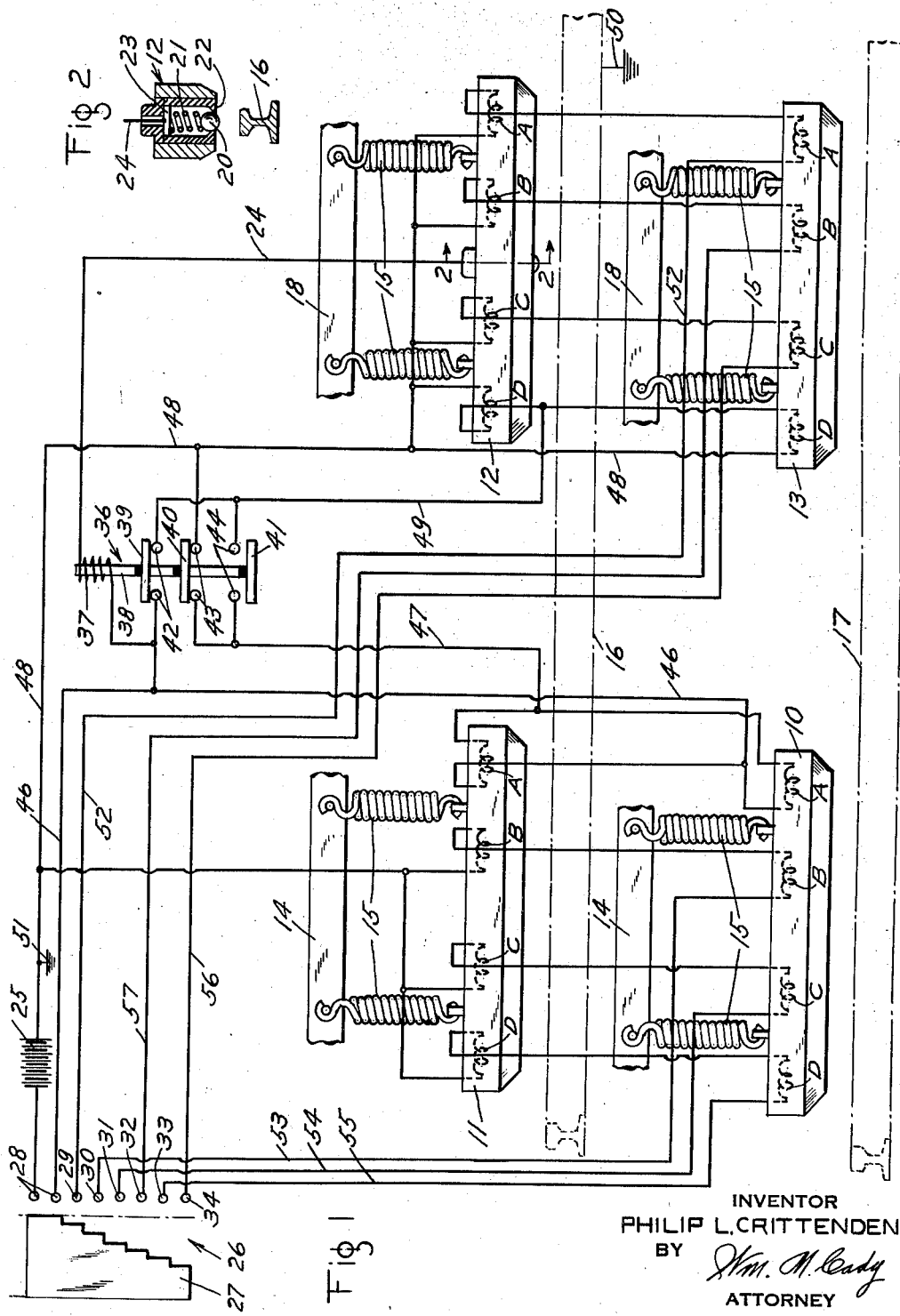

2,088,275

UNITED STATES PATENT OFFICE 2,088,275

MAGNETIC TRACK BRAKE

Philip L. Crittenden, Edgewood, Pa., assignor to The Westinghouse Air Brake Company, Wilmerding, Pa., a corporation of Pennsylvania Application October 15, 1936, Serial No. 105,638

6 Claims. (Cl. 188—165)

This invention relates to magnetic track brakes, and more particularly to magnetic track brakes for railway vehicles.

A desirable manner in which to suspend magnetic track brake devices from a vehicle truck is to suspend them on springs. When so suspended the magnetic track brake devices are caused to be attracted to and in engagement with the track rails by virtue of their own magnetism. Although the magnetic track brake devices may be suspended a small distance above the track rails, in order to insure that the track brake devices will always be attracted to the rails, it is necessary that they be energized above a predetermined degree.

If this degree of energization is maintained throughout the full movement of the track brake devices toward engagement with the rails, and also at the time the track brake devices engage the rails, the resulting braking effect produced may be so great as to cause severe shock to the vehicle, and considerable discomfort to the passengers. To avoid this it is desirable that the energization of the track brake devices be decreased just prior to engagement with the track rails, so that the initial braking effect will be low enough to cause the vehicle to be decelerated at an initial low rate of deceleration.

A principal object of the present invention is to provide a magnetic track brake system in which the several brake devices on a vehicle are so connected as to be energized to a degree sufficient to insure that they will always be attracted to the track rails, with means to reduce this degree of energization just prior to engagement of the brake devices with the rails.

Further objects and advantages of the invention, dealing with specific arrangements of parts, and interconnection of track brake devices, will be apparent from the following description, which is taken in connection with the attached drawing, wherein, Fig. 1 shows in schematic form an embodiment of the invention for a vehicle employing four track brake devices.

Fig. 2 is a sectional view taken along the line 2—2 of Fig. 1.

Referring now principally to Fig. 1, I have shown four magnetic track brake devices 10, 11, 12 and 13. Each of these devices is provided with four windings A, B, C and D. These windings are preferably disposed in any suitable relationship on a single core, which is attached to side plates terminating in rail-engaging shoes disposed above and extending longitudinally of a track rail.

The track shoe devices 10 and 11 are suspended from a truck frame 14 by means of springs 15 above track rails 17 and 16 respectively. In a similar manner, the track brake devices 12 and 13 are suspended from a truck frame 18 by similar springs 15. While the truck frames 14 and 18 are shown in fragmentary fashion only, it is to be understood that each of these represents a separate truck, there being two track brake devices per truck.

Referring now to Fig. 2, which shows a section of the track brake device 12, this track brake device is provided with a ball contact 20 urged downwardly by a spring 21. An insulating housing 22 retains the ball contact 20 in the position illustrated, and insulates the ball contact and spring from the track brake frame proper. A contact plate 23 at the top of the spring 21 provides a contact means for an incoming conductor 24. From the arrangement shown, it will be obvious that as the track brake device 12 approaches the rail 16, it will at some chosen height above the rail effect engagement of the ball contact 20 with the rail, to complete a circuit to be later described.

For manually controlling connection of the various windings of the several track brake devices to a source of current supply, here indicated as a battery 25, I have provided a controller device 26, preferably of the drum type. This device comprises a drum contact 27, illustrated in a release position, and movable to a first application position to bridge and connect together two stationary contact fingers 28, and movable to other of a plurality of application positions to sequentially engage stationary contact fingers 29 to 34, inclusive.

For controlling certain connections of certain of the track brake winding, I have provided a relay 36 having a winding 37, which when energized attracts a core member 38 upwardly. When the winding 37 is deenergized the core member 38 is in a downward position where contacts 39 and 40, carried thereby and insulated therefrom and from each other, respectively engage contacts 42 and 43, whereas another contact 41, similarly carried by the core member 38, is out of engagement with other contacts 44. When the winding 37 is energized the contacts 39 and 40 disengage respectively from the contacts 42 and 43, whereas the contact 41 engages the contacts 44.

In operation, with the controller 26 maintained in the release position, as illustrated, the suspension springs 15 maintain the track brake devices suspended above the track rails 16 and 17 at a given distance.

To effect an application of the magnetic track brakes, the operator preferably moves the controller 26 to the first application position, where the drum contact 27 engages only the two contact fingers 28. This establishes two circuits, the first of which is to the two windings A of the two track brake devices 10 and 11, this circuit including, beginning from the battery 25, the two contact fingers 28 and the drum contact 27, conductor 46, and the parallel combination of the two windings A of the two track brake devices 10 and 11, the return circuit to the battery 25 being by way of conductor 47, contacts 40 and 43 of relay 36, and conductor 48.

The other circuit is to the two windings D of the two track brake devices 12 and 13. This circuit includes, beginning from battery 25, contact fingers 28 and drum contact 27, conductor 46, relay contacts 39 and 42, conductor 49, and the parallel combination of the two windings D of the two track brake devices 12 and 13, the return connection to the battery 25 being by way of the conductor 48.

It will be observed that the group of two windings A in the track brake devices 10 and 11 are energized in parallel with the group of two windings D in the track brake devices 12 and 13. When thus connected to a source of current supply, it is intended that each track brake device will be sufficiently energized to be attracted to the rail.

Now when the track brake device 12 has approached within a predetermined distance of the rail 16, the ball contact 20 therein will engage the track rail and complete a circuit which will energize the relay winding 37. This circuit includes, beginning from battery 25, contact fingers 28 and drum contact 27, conductor 46, relay winding 37, conductor 24, contact plate 23, spring 21, ball contact 20, and the rail 16, which, as indicated, is grounded at 50, the battery 25 also having a ground connection as shown at 51.

The relay 37 will thus be energized to move the core member 38 upwardly. The relatively stationary contacts 42, 43 and 44, while shown diagrammatically, are to be understood to be resilient contacts, so constructed and arranged that when the member 38 moves upwardly the following sequence of operations takes place: First, contact 40 disengages from contacts 43, then contact 41 engages contacts 44, and finally contact 39 disengages from contacts 42. The relay is preferably of the fast-acting type, so that this sequence will occur rapidly and thus not delay positive movement of the brake devices to the track rails.

The effect of this operation of the relay is to connect the previously energized two groups of windings A and D in a series relationship rather than in the parallel relationship initially existing. This will be clear by observing the new circuit as follows: From the battery 25 the circuit now includes the contacts 28 and drum 27, conductor 46, the group of two windings A, conductor 47, relay contacts 41 and 44, conductor 49, the group of two windings D, and return conductor 48.

By changing the two groups of windings from parallel relationship to series relationship the energization is, of course, greatly reduced. Thus as the track brake devices engage the track rails the energization will be materially reduced so that a moderate braking effect only will be produced. Deceleration then will be begun at a low initial rate, and little or no shock will result.

If now the controller 26 is moved to the second application position, where the drum 27 engages the contact 29, the group of two windings A in the track brake devices 12 and 13 will be energized by way of conductor 52, it being noted that these two windings are connected in series, and that the return connection to the battery is also by way of the return conductor 48.

If the controller is now moved to the third application position, the group of two windings B in the track brake devices 10 and 11 will be similarly energized by way of conductor 53, these two windings being also in a series relationship.

In the fourth position of the controller the group of two windings C in the track brake devices 10 and 11 will be similarly energized by way of conductor 54. In the fifth position of the controller the group of two windings B in the track brake devices 12 and 13 will be energized by way of conductor 57. In the sixth controller position the two windings D in the two brake devices 10 and 11 will be energized by way of conductor 55. In the last position of the controller the group of two windings C in the brake devices 12 and 13 will be energized by way of conductor 56.

It will thus be seen that by virtue of the arrangement shown certain windings of all of the track brake devices are so connected initially as to provide for prompt attraction of the track brake device toward the track rail, and that just prior to engagement of one of the track brake devices with the track rail, the connections are so changed as to materially reduce the potential braking effect produced by the track brake devices. Subsequently, the controller may be moved to various application positions to gradually increase the braking effect, so as to produce a smooth and effective stop.

While I have illustrated a particular magnetic track brake system employing four magnetic track brake devices, it will be apparent that my invention may be adapted to systems employing more or less than this number of devices. Further, other modifications may be made without departing from the spirit and scope of the invention, and I do not desire to be limited other than according to the appended claims.

Having now described my invention, what I claim as new and desire to secure by Letters Patent, is:

1. In a magnetic track brake system, in combination, a plurality of magnetic track brake devices, each of which comprises a plurality of windings, means for connecting one of the windings in one of said track brake devices in parallel with one of the windings in another of said track brake devices and thus forming a parallel group of two windings, there being such a parallel group for each pair of magnetic track brake devices, means for supplying current to said parallel goups of windings, an element carried by one of said track brake devices and adapted to engage the track rail ahead of engagement by said track brake device, and means operative before said element engages said track rail for causing current to be supplied to said groups of windings in parallel, and operative upon engagement of said element with said track rail to cause current to be supplied to said groups of windings in series.

2. In a magnetic track brake system, in combination, a plurality of magnetic track brake devices, each of said devices having at least one energizable winding, means for connecting the winding of one of said track brake devices in parallel with the winding of another of said track brake devices and thus forming a parallel group, there being such a parallel group for each pair of track brake devices, means operative to normally connect said several parallel groups in parallel with a source of current supply, a contact carried by one of said track brake devices and adapted to engage a track rail upon movement of said track brake device toward said track rail, and means responsive to engagement of said contact with said track rail for connecting said several parallel groups in series with said source of current supply.

3. In a magnetic track brake system, in combination, a plurality of magnetic track brake devices, each of said devices having at least one energizable winding, means for connecting the winding of one of said track brake devices in parallel with the winding of another of said track brake devices and thus forming a parallel group, there being as many such parallel groups as there are pairs of track brake devices, a relay operative in its deenergized position to connect said parallel group in parallel relationship with a supply circuit and operative in its energized position to connect said parallel group in series relationship with said supply circuit, a contact carried by one of said track brake devices and adapted to engage a track rail ahead of said track brake device when it moves toward engagement with the track rail, and means responsive to engagement of said contact with said track rail for energizing said relay.

4. In a magnetic track brake system, in combination, a plurality of magnetic track brake devices each of which comprises at least one energizable winding, spring means for supporting each of said track brake devices from a vehicle truck, means for connecting the winding of one of said track brake devices in parallel with the winding of another of said track brake devices and thus forming a parallel group, there being as many of said parallel groups as there are pairs of track brake devices, a manually operable controller for supplying current to said parallel groups, a control device normally establishing circuits through which said controller supplies current to said groups in a parallel relationship, an element carried by one of said track brake devices and adapted to engage a track rail ahead of engagement by said track brake device, and means responsive to engagement of said element with said track rail for causing said control device to establish circuits through which current is supplied to said parallel groups in a series relationship.

5. In a magnetic track brake system, in combination, a plurality of magnetic track brake devices each of which comprises a plurality of separate energizable windings, means for connecting one of the windings of one of said track brake devices in parallel with one of the windings of another of said track brake devices and thus forming a parallel group, there being as many such parallel groups as there are pairs of magnetic track brake devices, means for connecting the remainder of the windings of each track brake device in separate series groups with the remainder of the windings in another of said track brake devices, there being as many of such series groups as there are pairs of said other windings, a relay device operative in a deenergized position to connect said parallel groups in a parallel relationship, and operative when energized to connect said parallel groups in a series relationship, a controller device operative in the first of a plurality of application positions to supply current to only said parallel groups in said parallel relationship, a contact carried by one of said track brake devices and adapted to engage a track rail ahead of engagement by said track brake device, means responsive to engagement of said contact with said track rail for energizing said relay to connect said parallel groups in a series relationship, and means responsive to movement of said controller device successively to its other application positions to successively energize said series groups of windings.

6. In a magnetic track brake system, in combination, four magnetic track brake devices, each of which comprises at least two windings, means for connecting one of the windings of each of said track brake devices in series with one of the windings of another of the track brake devices and thus forming a parallel group, there being two such parallel groups, means for connecting the other winding of each track brake device in series with the winding of another track brake device and thus forming a series group, there being two such series groups, a relay operative when deenergized to connect said two parallel groups in a parallel relationship and operative when energized to connect said two parallel groups in a series relationship, a controller device operative to a first application position to supply current to said two parallel groups, said relay being deenergized at this time to connect said groups in the aforesaid parallel relationship, a contact carried by one of said track brake devices and adapted to engage a track rail ahead of engagement by said track brake device, means responsive to engagement of said contact with said rail for energizing said relay to thus connect said two parallel groups in a series relationship, and means responsive to the movement of said controller device to another application position for energizing one of said series groups and responsive to movement of said controller device to still another application position for energizing the other of said series groups.

PHILIP L. CRITTENDEN.